US010800017B2

(12) United States Patent
Belanger et al.

(10) Patent No.: US 10,800,017 B2
(45) Date of Patent: Oct. 13, 2020

(54) TOOL FOR ATTACHING A REPLACEABLE TREATMENT HEAD TO A WASH MEDIA ELEMENT

(71) Applicant: WashMe Properties, LLC, Northville, MI (US)

(72) Inventors: Michael J. Belanger, Northville, MI (US); Adam Kelsey, Northville, MI (US); Mark Morin, Plymouth, MI (US)

(73) Assignee: WASHME PROPERTIES, Northville, MI (US)

( * ) Notice: Subject to any disclaimer, the term of this patent is extended or adjusted under 35 U.S.C. 154(b) by 277 days.

(21) Appl. No.: 15/477,870

(22) Filed: Apr. 3, 2017

(65) Prior Publication Data

US 2018/0281162 A1  Oct. 4, 2018

(51) Int. Cl.
| *A46B 13/02* | (2006.01) |
| *A46B 7/04* | (2006.01) |
| *A46B 3/00* | (2006.01) |
| *B25B 27/14* | (2006.01) |
| *B25G 1/10* | (2006.01) |
| *B60S 3/06* | (2006.01) |
| *A46D 1/00* | (2006.01) |
| *B60S 1/04* | (2006.01) |
| *B25G 1/00* | (2006.01) |

(52) U.S. Cl.
CPC ............. *B25B 27/14* (2013.01); *A46B 3/005* (2013.01); *A46B 7/044* (2013.01); *A46B 13/026* (2013.01); *A46D 1/0207* (2013.01); *B25G 1/00* (2013.01); *B60S 1/0469* (2013.01); *A46B 2200/3046* (2013.01)

(58) Field of Classification Search
CPC .......... A46B 13/026; A46B 2200/3046; A46B 3/005; A46B 7/044; A46D 1/0207; B25B 27/14; B25G 1/00; B60S 1/0469
USPC ........................................................ 81/15.7
See application file for complete search history.

(56) References Cited

U.S. PATENT DOCUMENTS

| 1,000,168 | A | * | 8/1911 | Glanz | ..................... | B29C 73/08 |
| | | | | | | 81/15.7 |
| 3,783,715 | A | * | 1/1974 | Niconchuk | ............. | B29C 73/08 |
| | | | | | | 81/15.7 |
| 5,623,741 | A | * | 4/1997 | Clark | .................... | A46B 13/005 |
| | | | | | | 15/230.16 |
| 8,990,993 | B2 | * | 3/2015 | Belanger | ............... | A46B 13/001 |
| | | | | | | 15/53.2 |
| 9,003,927 | B2 | * | 4/2015 | Stansbury | ............... | B29C 73/08 |
| | | | | | | 156/97 |
| D729,993 | S | * | 5/2015 | Belanger | ......................... | D32/4 |
| 2013/0104332 | A1 | * | 5/2013 | Belanger | .............. | A46B 13/001 |
| | | | | | | 15/246 |
| 2014/0259681 | A1 | * | 9/2014 | Asbery | ................ | B26D 7/2614 |
| | | | | | | 30/116 |

(Continued)

*Primary Examiner* — Joseph J Hail
*Assistant Examiner* — Arman Milanian
(74) *Attorney, Agent, or Firm* — Dickinson Wright PLLC

(57) ABSTRACT

A tool for attaching a treatment head to a wash media element of a vehicle wash component includes a nose portion and a handle portion. The nose portion is sized to pass through an opening in the wash media element. The nose portion includes a slot for receiving and retaining a base portion of the treatment head to secure it to the wash media element such that the nose portion and treatment portion are disposed on opposite sides of the wash media element.

12 Claims, 8 Drawing Sheets

(56) References Cited

U.S. PATENT DOCUMENTS

2014/0259727 A1\* 9/2014 Belanger ............... B60S 3/002
  34/355

\* cited by examiner

TOOL FOR ATTACHING A REPLACEABLE TREATMENT HEAD TO A WASH MEDIA ELEMENT

FIELD OF THE DISCLOSURE

The present disclosure relates generally to a wash media element for a vehicle wash component that utilizes replaceable treatment heads to effectuate vehicle cleaning. More specifically, the present disclosure relates to a tool for attaching treatment heads to a wash media element of a vehicle wash component.

BACKGROUND

Vehicle wash implements, such as rotary brushes, are typically constructed with various types of flexible washing elements. Typical vehicle wash elements are limp in the non-rotating state, and "extend" or "blossom" to their working length only when the brush is rotated due to centrifugal force. To increase the tension in the washing elements and therefore their effective rigidity, it is necessary to rotate the brush faster. Even then and even at high rotational speeds, the washing elements can bend and deflect in unpredictable ways such that they make more or less random patterns of contact with the vehicle surface, and exert inconsistent working pressures on the vehicle surface as they make contact. The result is that high rotational speeds and redundant points of contact are necessary to get an acceptable cleaning result.

Most of these known vehicle wash elements are made of a pliable non-rigid material which results in the individual elements hanging downwardly under the force of gravity when the brush is motionless. As is known, when the attached media elements hang downwardly, their outer ends are generally disposed adjacent a lower end of the rotary brush. At rest, the component thus has a small effective contact area or working diameter, as defined by the outermost boundary or footprint of the elements.

The useful working diameter of these rotary brushes is only increased to a sufficient size where the media elements extend generally outwardly in a perpendicular fashion from the hub and into contact with a vehicle, when the brush is rotated at high speeds. At high rotational speeds, the media elements extend outwardly due to centrifugal force to a useful working diameter or footprint. When the brush stops rotating or the speed of rotation is reduced considerably, the centrifugal force is insufficient to support the media elements and they will hang or droop.

It is thus common practice to rotate vehicle wash brushes at higher speeds when washing a vehicle. These speeds are typically in the range of 60 RPM to 110 RPM and higher with much of this rotational speed being needed to extend the flexible washing elements to their working length. At these high rotational speeds, the otherwise limp washing elements can reach the surface of a vehicle to be washed. These high rotational speeds also help maintain a safe working distance between the vehicle surface and the rigid central hub of the rotary car wash brush. Unfortunately, as the rotational speeds of these vehicle wash brushes are increased to provide a necessary working diameter, other problems are created.

One known problem with conventional brushes that rotate at high speeds is that the higher the speed at which the prior media elements contact the vehicle surface, the possibility of damaging the exterior surface of the vehicle increases. Specifically, despite the fact that these prior media elements are constructed of a soft material, fine hazing and microscratching of a painted vehicle surface can occur as a result of the velocity at which the media elements impact the vehicle surface. This is particularly true if the media elements are carrying dirt particles or the like when they contact the vehicle exterior. Rotating these brushes at high speeds can also cause damage to the vehicle through the media elements lassoing wipers, mirrors, antennas or the like and potentially tearing them off.

Still another problem with the high speeds at which current vehicle wash brushes are rotated is that they create significant noise during the vehicle washing process. The high volume of noise is known to dissuade some customers from choosing to use friction car washes as it can cause an unpleasant washing experience for vehicle occupants. Indeed, many persons, particularly young children, can become uncomfortable by the experience of riding through a vehicle wash filled with noisy, rotating, and undulating mechanical elements which have been characteristic of commercial car washes for decades. Still other consumers are dissuaded from using friction car washes due to the perception that the high speed at which existing brushes rotate creates an unsafe environment.

Still a further problem with rotating these brushes at high speeds is that substantial energy is required to maintain their operation. In addition to increased energy costs, the vehicle wash equipment can wear prematurely due to the aggressive nature in which they are operated, which further adds to their cost of operation. Additionally, rapidly rotating brush elements tend to sling water and dirt over long distances, giving rise to substantial maintenance tasks for the owner or operator of a commercial car wash.

As the wash media elements are principally responsible for cleaning the vehicle, they can wear over time due to repeated contact with the vehicle. They can also eventually cease to clean effectively due to perpetual contact with dirt, water and chemicals. They can also become damaged or ripped from the vehicle wash component. In each of these instances, replacement of the wash media elements is required. The replacement process is generally very labor intensive and requires significant downtime of the machine and thus the vehicle wash. This is particularly true if only a handful of wash media elements require replacement. As the replacement process is very time consuming and costly, many operators avoid this process unless it is absolutely necessary.

SUMMARY OF THE INVENTION

It is therefore an aspect of the present disclosure to provide a media element including replaceable treatment heads that decreases the cost associated with replacing damaged media elements.

It is a related aspect of the present disclosure to provide a tool for attaching a treatment head to a media element that minimizes the time associated with replacing damaged media elements.

It is another aspect of the present disclosure to provide a media element including treatment heads the can be readily replaced without requiring shut down of an associated vehicle wash component.

It is yet another aspect of the present disclosure to provide a vehicle wash component that increases the longevity of attached media elements.

It is a further aspect of the present disclosure to reduce the wear and tear on the mechanical parts of a vehicle wash component.

It is yet a further aspect of the present disclosure to provide a treatment element for a vehicle wash component that can be readily and inexpensively replaced without affecting operation of the vehicle wash component.

It is a related aspect of the present disclosure to provide a treatment element for a vehicle wash component that can be readily and inexpensively replaced without needing to remove from the wash component an associated wash media element to which the treatment head will be attached.

In accordance with the above and the other aspects, a tool for use in attaching a treatment head to a wash media element of a vehicle wash component is disclosed. The tool can include a nose portion that is configured to engage an aperture formed through the wash media element. The nose portion may include a slot formed therein for receiving an end portion of the treatment head to be attached to the wash media element. The slot has a width and a height with the width being sized less than the end portion of the treatment head to retain the treatment head in the slot as the nose portion passes through the aperture in the wash media element. A handle portion is coupled to the nose portion to facilitate gripping and manipulation of the tool.

In accordance with another aspect, a method of attaching a treatment head to a wash media element of a vehicle wash component is provided. The wash media element is generally self-supporting along it length and includes at least one aperture formed therein for receipt of a treatment head. The treatment head has a base portion and a contact portion. An attachment tool having a nose portion with a slot formed therein is provided. The at least one treatment head is coupled to the attachment tool such that it is received in the slot with the base portion and contact portion on opposing sides of the nose portion. The nose portion with the coupled base portion may be passed through the aperture of the wash media element. Once passed through the aperture, the base portion of the treatment head is oriented such that it is prevented from passing back through the aperture and remains secured to the wash media element.

In accordance with a still further aspect, a kit for attaching a treatment head to a wash media element is provided. The kit can include a plurality of individual treatment heads each having a base portion configured to pass through an aperture in the wash media element and be retained in that orientation. The kit also may include a tool having a handle and a nose portion, which is configured to pass through the aperture in the wash media element. The nose portion can include a slot configured to retain the treatment heads therein as the nose portion is passed through the aperture such that the base portions of the treatment heads are passed through apertures in the wash media element to fixedly secure them thereto.

Other aspects of the present disclosure will be readily appreciated, as the same become better understood by reference to the following detailed description when considered in connection with the accompanying drawings.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Aspects incorporating teachings of the present disclosure are shown and described with respect to the drawings presented herein, in which.

DETAILED DESCRIPTION OF THE DISCLOSURES

Figure 1:
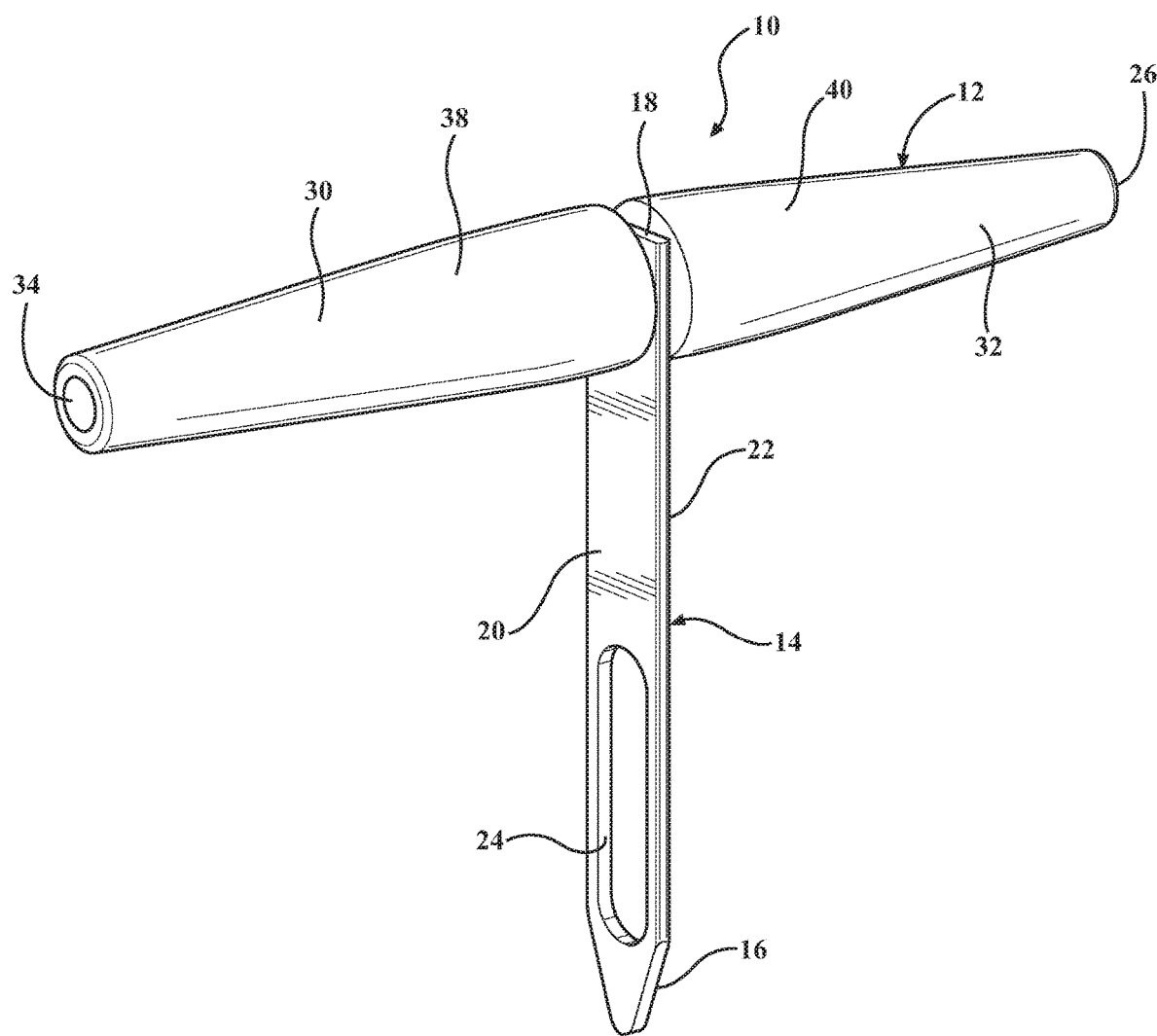
FIG. 1 is a perspective view of a tool for attaching a treatment head to a wash media element in accordance with an aspect of the present disclosure.
Figure 2:
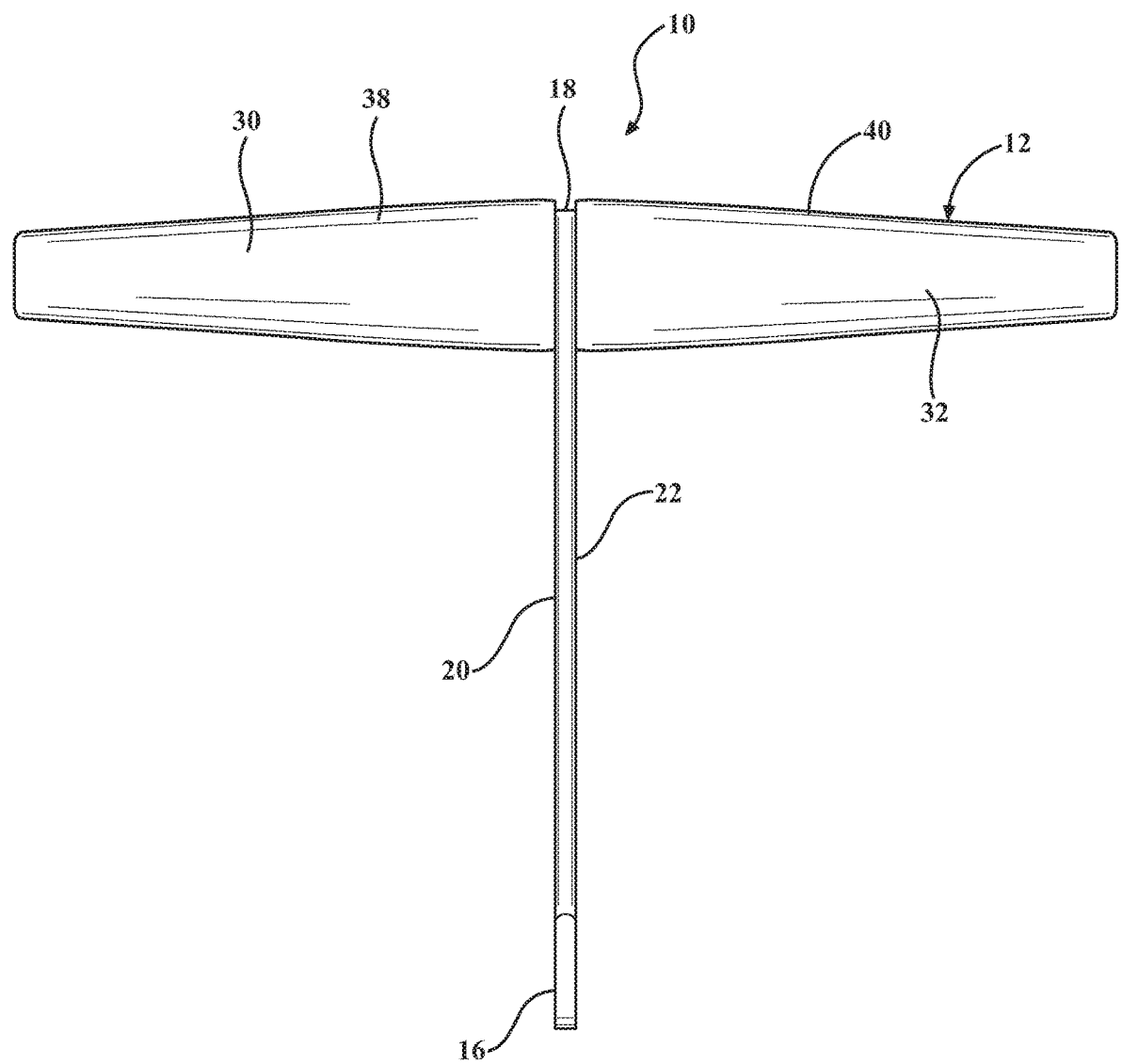
FIG. 2 is a front view of the tool of FIG. 1.
Figure 3:
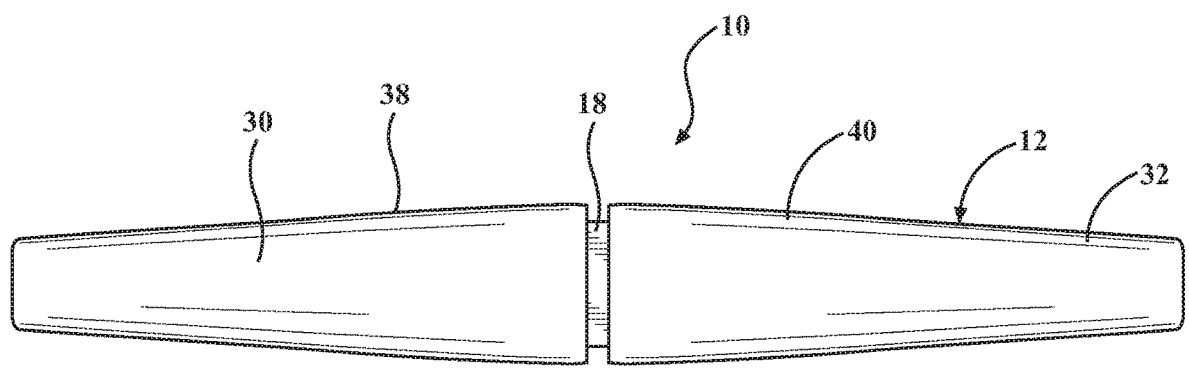
FIG. 3 is a top view of the tool of FIG. 1.
Figure 4:
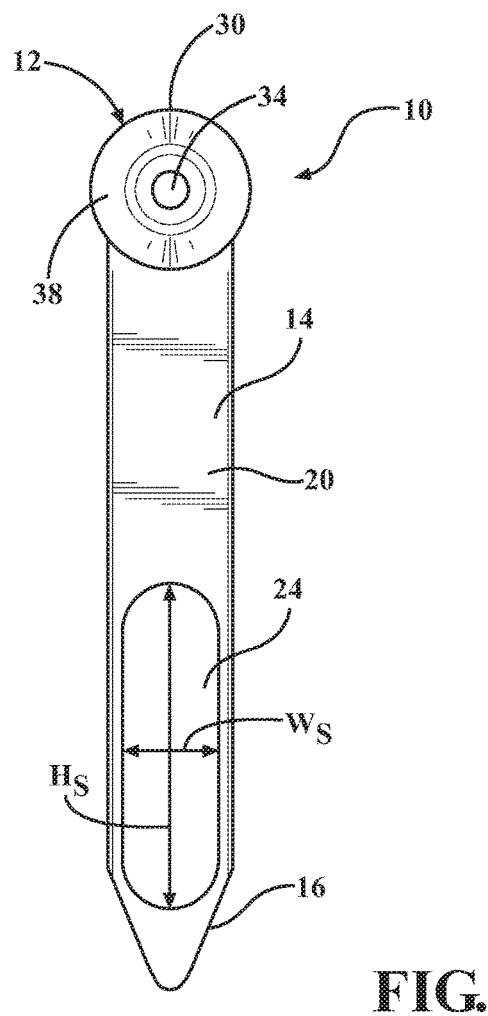
FIG. 4 is a side view of the tool of FIG. 1.

The present disclosure relates to a tool for attaching a treatment head to a wash media element of a vehicle wash component and a method of attaching same. According to an aspect, FIGS. 1 through 4 illustrate a tool 10 for use in attaching a treatment head to a wash media element of a vehicle wash component. As shown, the tool 10 may have a generally t-shape with a handle portion 12 and a nose portion 14. It will be appreciated that the disclosed tool may have a variety of shapes and configurations.

According to an aspect, the nose portion 14 may have a first end 16 that is configured to engage a media element and a second end 18 disposed opposite the first end 16. The second end 18 may be disposed adjacent the handle portion 12. The first end 16 of the nose portion 14 may have a generally pointed or tapered shape to facilitate insertion into an aperture in an associated wash media element. The nose portion 16 may include a pair of opposing side surfaces 20, 22 and have a generally planar shape along its length from the first end 16 to the second end 18. According to an aspect, the nose portion 14 may be shaped to match the configuration of the wash media element aperture. The nose portion 14 may also include a slot 24 formed therein that extends between and is open to both the opposing side surfaces 20, 22. The slot 24 may take on a variety of different shapes and configurations. The nose portion 16 may be formed of a metal material. However, the nose portion 16 may be formed of a variety of other suitable materials, such as plastic. It will also be appreciated that the nose portion 14 may take on a variety of different shapes or configurations.

According to an aspect, the handle portion 12 may consist of a pair of opposing grip portions 30, 32 that extend generally perpendicularly from either opposing side surface 20, 22 of the nose portion 14. Each grip portion 30, 32 may be formed as a single piece or from multiple pieces. According to an aspect, the grip portions 30, 32 may each be enlarged and tapered like conventional handle bars to allow a user to readily grip them in order to easily manipulate the tool. According to an aspect, the grip portions 30, 32 may be formed from a smooth material such as wood. However, the grip portions 30, 32 may be formed of a variety of other suitable materials such as a plastic. As shown, the grip portions, 30, 32 may each have a generally cylindrical shape that tapers away from the nose portion 14. According to an aspect, the grip portions 30, 32 may include inner support members 34, 36 that are secured to the second end 18 of the nose portion 14 at a respective side surface 20, 22 with outer members 38, 40 secured around the support members 34, 36.

Figure 5:
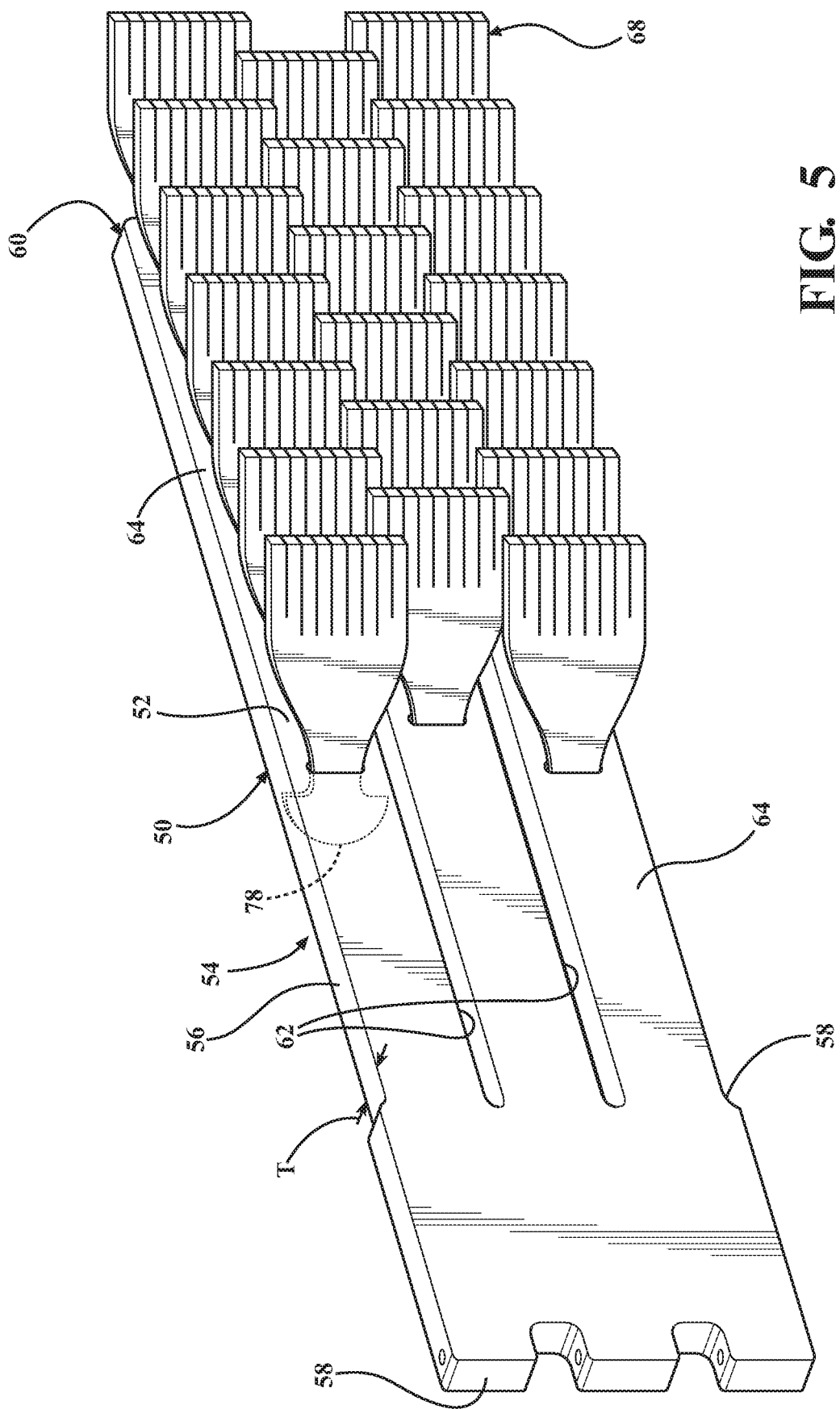
FIG. 5 is an illustration of a wash media element body without attached treatment heads in accordance with an aspect of the present disclosure.
Figure 6:
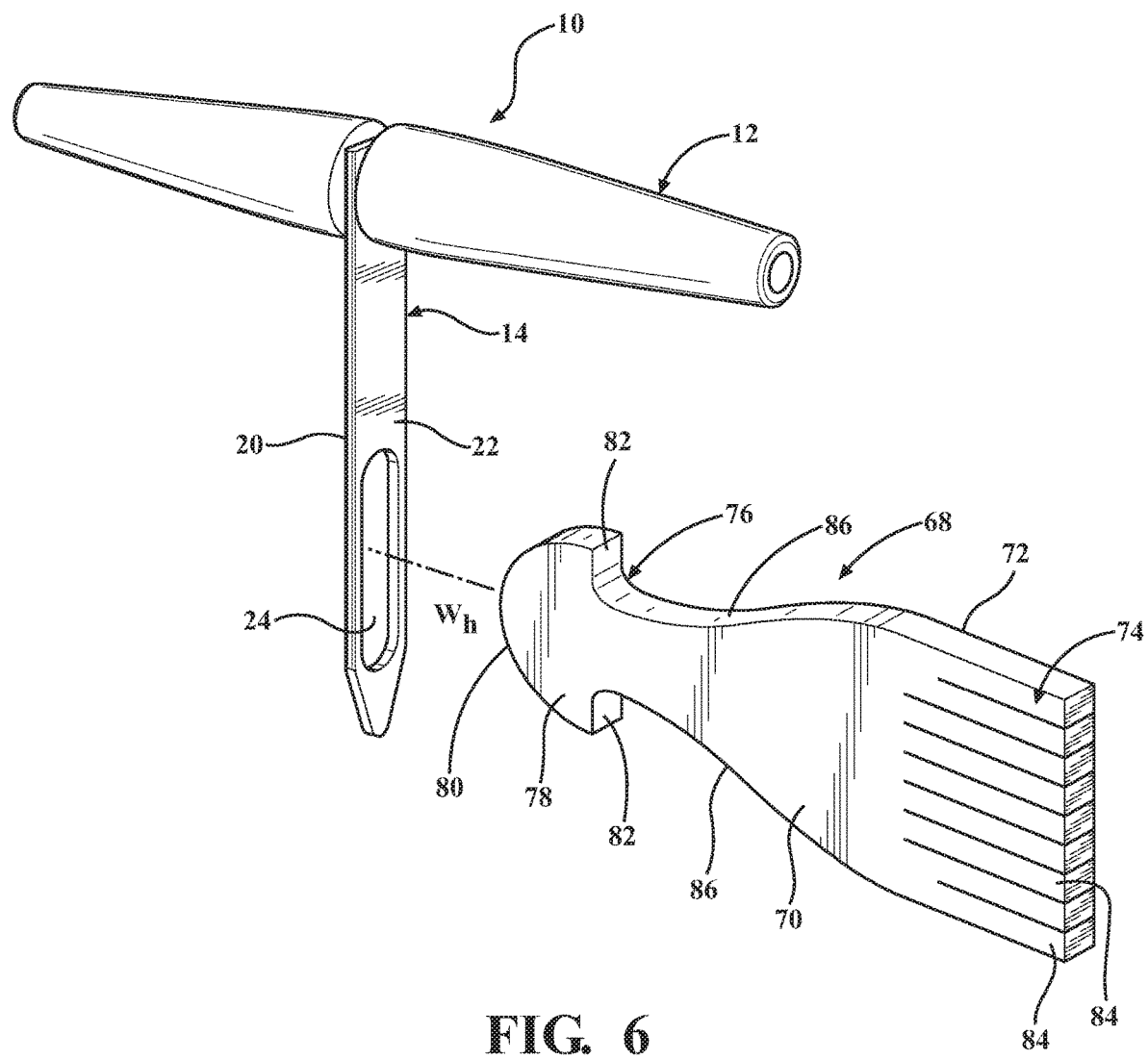
FIG. 6 is a schematic exploded view of a treatment head and a tool for attaching the treatment head to an exemplary wash media element in accordance with an aspect of the present disclosure.

FIG. 5 is an illustration of an exemplary media element 50 to which a treatment head is to be attached in accordance with an aspect of the disclosure. The wash media element 50 may be configured to be secured to a hub of a vehicle wash component. It will be appreciated that the wash media element can have varying configurations, lengths or orientations as needed. As shown, the media element 50 may consist of an elongate structure, as is discussed in more detail in Applicant's U.S. Pat. No. 8,990,993, entitled "Vehicle Wash Component", the disclosure of which is hereby incorporated by reference as though set forth fully herein. The media element may alternatively be constructed of other suitable materials.

According to an aspect, the media element 50 may be constructed of two separate portions that are adhesively bonded together with a cord or bead welt at one end for mounting in a media securement member. Alternatively, the media element 50 may be formed as single pieces by conventional forming processes. As is shown, the media element 50 may be utilized in a vehicle wash brush in a tunnel vehicle wash facility. Alternatively, the media element may be employed in a brush for a rollover vehicle wash where the rotation direction of the brush reverses with each pass of the rollover gantry over the vehicle being washed.

Figure 10:
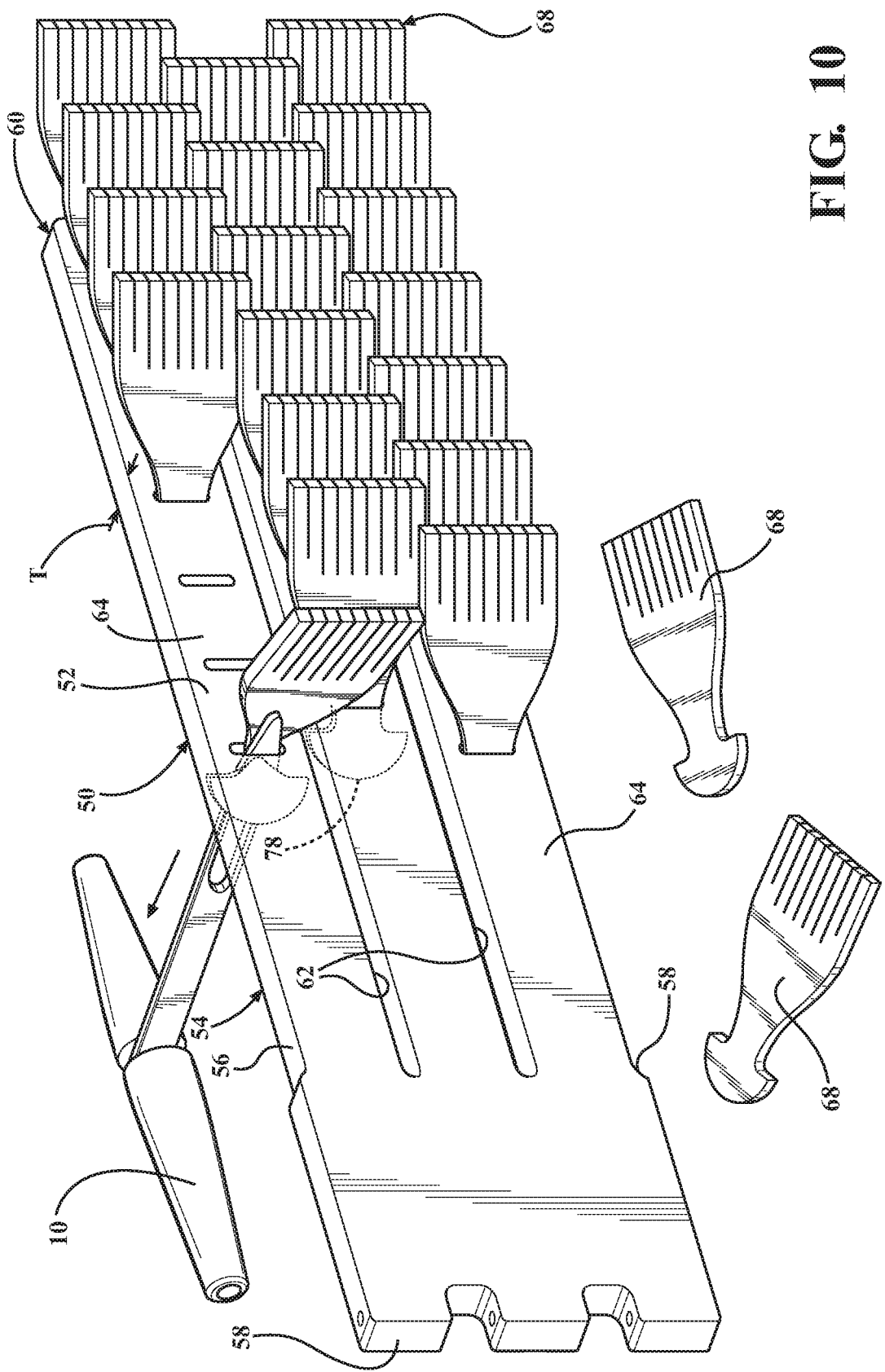
FIG. 10 is a schematic view illustrating a treatment head as attached to a wash media element in accordance with an aspect of the present disclosure.

As shown, the media element 50 can include a front face 52, a rear face 54 and a pair of edge walls 56 that extend between the front and rear faces 52, 54 and has a thickness (T) defined between the front and rear faces 52, 54 (See FIG. 10). According to another aspect, each media element 50 may be formed of a self-supporting material such that it substantially retains a constant shape between a first end 58 and a second end 60 when the hub to which they are attached is rotated. For example, the media element 50 may be made of an elastomeric polymer type material such as ethylene-vinyl acetate (EVA). It will be appreciated that the media elements 50 could have a variety of different shapes and may be formed of a variety of different types of suitable materials.

According to an aspect, each media element 50 may further define a plurality of elongated slots 62 that extend generally from the second end 60 toward the first end 58 along a portion of the media element 50 to divide it into a plurality of elongated fingers 64 disposed in spaced and parallel relationship with one another. The elongated slots 62 can extend fully between the front face 52 and the rear face 54 at any angle. As shown in the figures, the elongated slots 62 may extend generally linearly, however, it should be appreciated that they could extend in other shapes, e.g., an arc or zigzag pattern. As such, the fingers 62 may have other shapes as well. According to a further aspect, the elongated slots 62 may be oriented generally parallel to the edge walls 56, however, they may also be angled or sloped. Additionally, more or fewer slots 62 may be employed.

As shown, according to an aspect, the slots 62 may be formed by the removal of material such that they may be defined by the absence of material. In other words, the opposing edges of the elongated fingers 64 may be spaced apart from one another by the slot 62. It should be appreciated that during rotation of the media elements 50, the slots 62 may advantageously allow components of the vehicle to pass therethrough between the fingers 62 to ensure that the vehicle is evenly engaged by the fingers 62 during each pass of the media element 50 and to ensure that the components are not snagged and damaged or torn from the vehicle. For example, an antenna of the vehicle may pass through the slot 62, thus allowing the fingers 64 to contact and remove debris from the surfaces of the vehicle on opposing sides of the antenna. Furthermore, it should be appreciated that the fingers 64 may bend/pivot relative to one another during contact with this vehicle to allow non-planar structures of the vehicle to be evenly contacted and cleaned by the fingers 64, as discussed herein.

As shown, each of the elongated fingers 64 of the media element 50 may also include a plurality of crosswise apertures or niches 66 that extend generally perpendicularly to the elongated slots 62. The niches 66 may be configured such that they may receive, for purpose of attachment, a treatment head 68 to connect it to the wash media element 50. According to an aspect, each of the treatment heads 68 may have a forward face 70 and a rearward face 72 and may extend between a contact portion 74 and a tongue portion 76. Like the media element 50, each of the treatment heads 68 may be formed of a shape retaining material including, but not limited to, an elastomeric polymer type material such as ethylene-vinyl acetate (EVA). It will be appreciated that the treatment heads 68 could be formed from a variety of different materials. According to an aspect, each treatment head 68, like the media element 50, may be self-supporting along their lengths. This self-supporting characteristic can serve to apply a pressure force on the vehicle to provide improved cleaning.

According to another aspect, the tongue portion 76 can include an enlarged head portion 78 that assists in retaining the treatment heads 68 secured to the wash media element 50. According to an aspect, the head portion 78 may be sized so that its width ($W_h$) is larger than the width ($W_n$) of the niche 66 to which it is inserted to ensure attachment during operation. The enlarged head portion 78 can include a rounded bottom surface 80 that terminates in a pair of opposing shoulder portions 82. According to a further aspect, the head portion 78 may be sized so that its width ($W_h$) is less than the width ($W_f$) of the elongated finger 64 to which it is attached. It will be appreciated that the treatment heads 68 may have a variety of different shapes and configurations.

According to another aspect, the contact portion 74 of each treatment head 68 may be configured to contact the vehicle to remove debris and water therefrom. Each contact portion 74 may include a plurality of bristle portions 84 that may have various widths and lengths. The bristle portions 84 are preferably independently moveable with respect to one another to provide increased cleaning capabilities. As the bristle portions 84 move independent of one another, they can expose side portions of each bristle portion that can contact a vehicle and effect cleaning. As shown, according to one aspect, nine (9) individual bristles may be employed. However, it will be appreciated that any number of bristle portions 84 may be employed. It will be appreciated that the treatment heads 68 may extend from the crosswise niches 66 at any angle relative to the fingers 64. For example, the treatment heads 68 may extend from the niches 66 with the forward face 70 disposed at approximately a 45 degree angle relative to the front face 52 of the finger 64. According to another example, the treatment heads 68 can extend from the niches 66 with the forward face 76 of the treatment heads 68 disposed at approximately a 90 degree relative to the front face 52 of the finger 64. It will be appreciated that the treatment heads 68 could extend at other angles as desired.

According to a still further aspect, the treatment heads 68 may be formed such that the contact portion 74 of each of the treatment heads 68 has a width ($W_{cp}$) that is greater than the width ($W_f$) of the elongated finger 64 to which it is attached such that it can extend past the edges of the fingers 64 and overlie at least part of the slots 62. It should be appreciated that positioning the contact portions 74 in this overlapping fashion over the slots 62 advantageously prevents "skunk stripes" on the vehicle at the location of the slots 62 between the fingers 64. More specifically, the bristles portions 84 can provide a contact point with the vehicle that would otherwise not be present because of the presence of the slots 62. As shown, the treatment head 68 can have a pair of sides 86 that generally converge from the contact portion 74 toward to the head portion 78 such that the width decreases. The sides 86 can converge in a generally arcuate manner in order to avoid any sharp or edge portions. According to an aspect, the tongue portion 76 that connects the contact portion 74 to the head portion 78. The tongue portion 76 may have a sufficient width to ensure that the contact portion 74 exerts a force onto a vehicle exterior. The tongue portion 76 thus can exert a spring force to keep the contact portion 74 engaged with the vehicle exterior.

Figure 7:
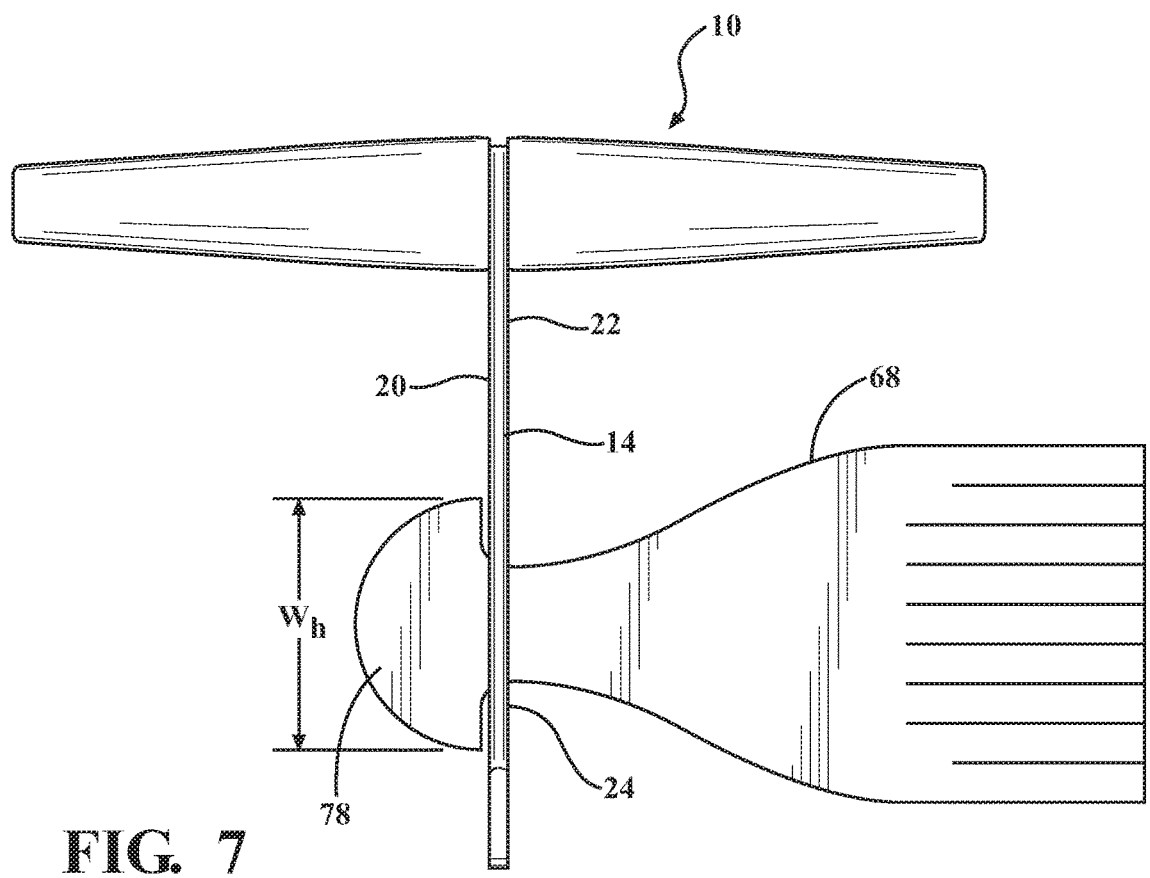
FIG. 7 is a schematic illustration of a treatment head disposed within a slot of an attachment tool to effect attachment thereof to a wash media element in accordance with an aspect of the present disclosure.
Figure 8:
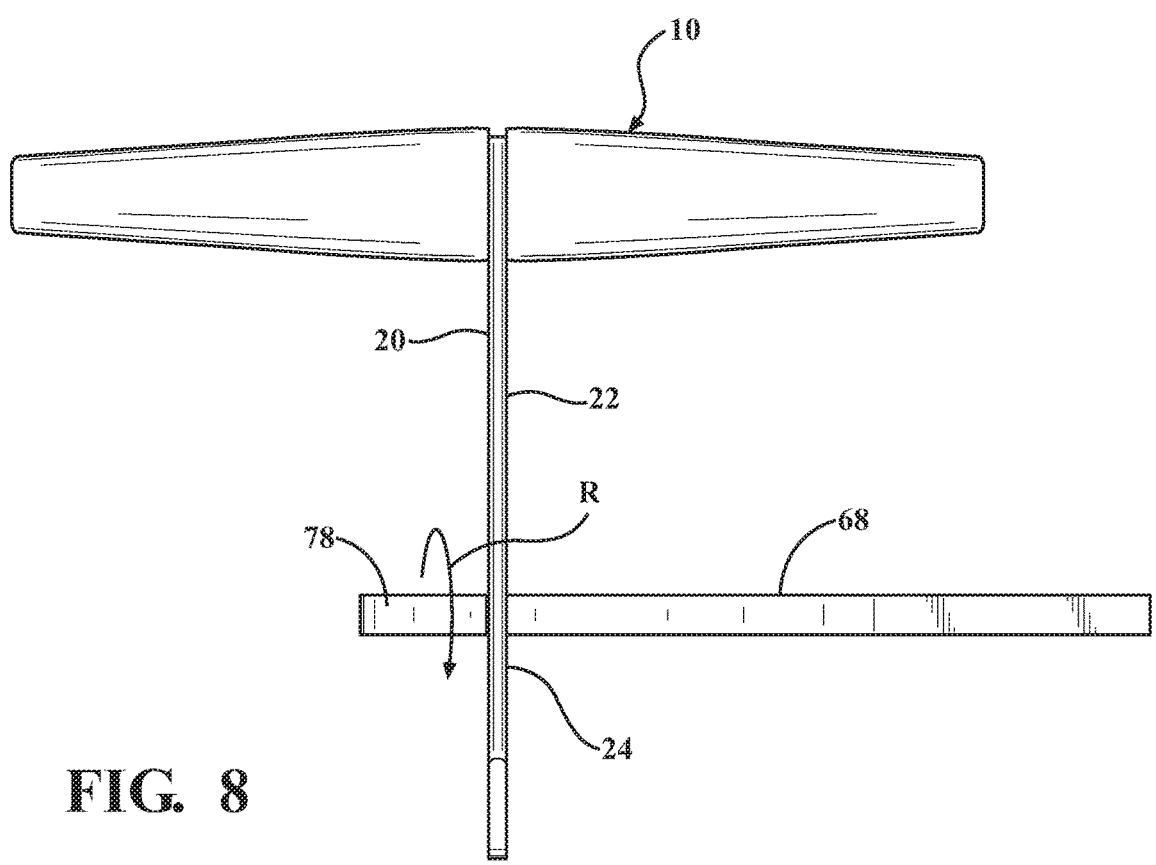
FIG. 8 is a schematic illustration of a treatment head rotated within a slot of an attachment tool in accordance with an aspect of the present disclosure.
Figure 9:
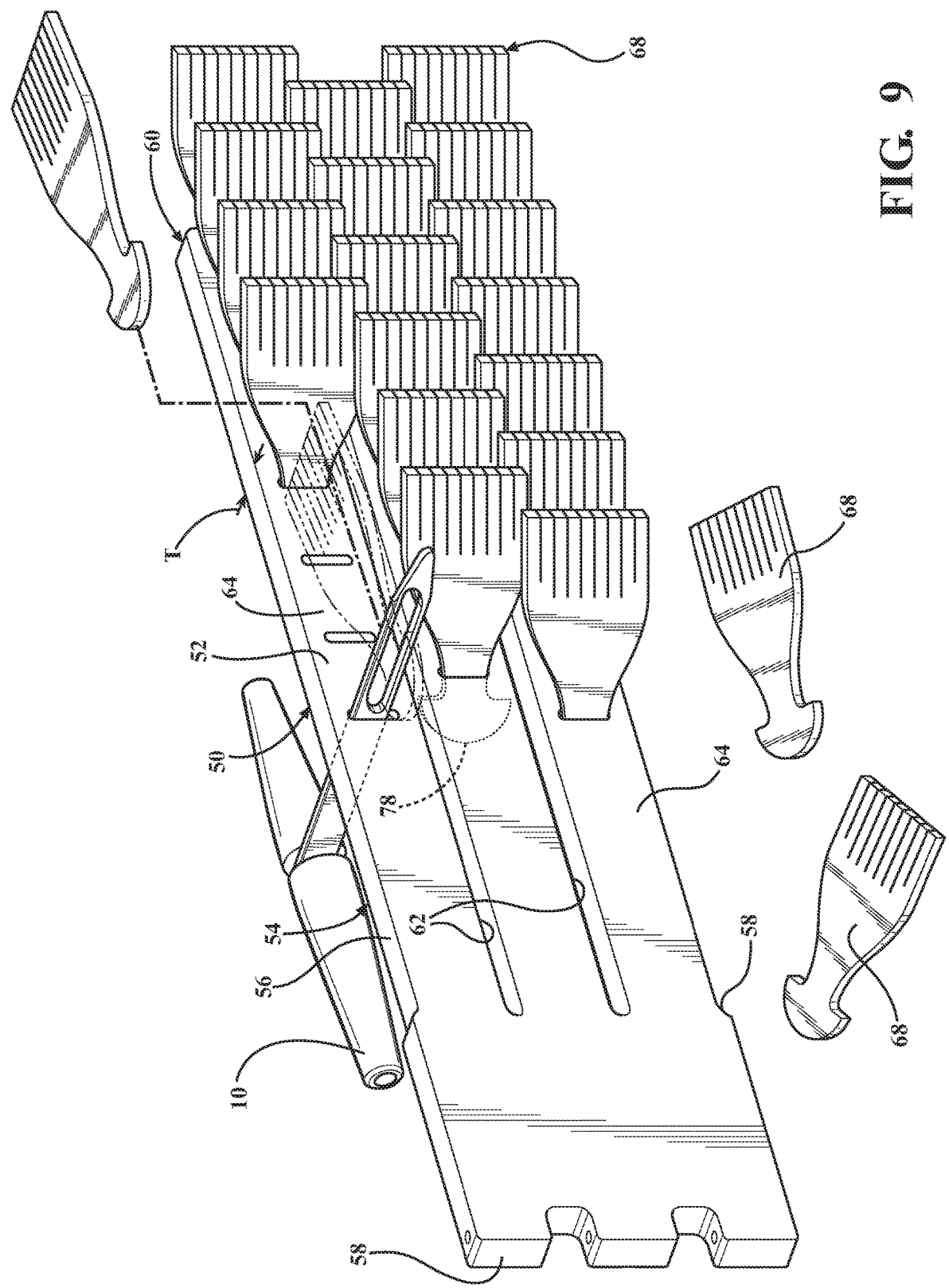
FIG. 9 is a schematic illustration of a tool and associated treatment head inserted into a slot in a wash media element to effect attachment in accordance with an aspect of the present disclosure.

FIGS. 7 through 9 illustrate an exemplary method for attaching a treatment head 68 to a wash media element 50 in accordance with an aspect of the present disclosure. According to an aspect, although not expressly shown in FIGS. 7 and 8, the nose portion 14 of the tool 10 may be passed through the niche 66. Once the nose portion 14 is exposed on the front face 52, the treatment head 68 may be placed in communication with the tool 10 in order to effect attachment thereof to the media element 50. Specifically, as shown in FIG. 7, after the nose portion 14 has passed through the niche 66, the head portion 78 of the treatment head 68 may be passed through the slot 24 in the nose portion 14 of the tool 10. According to an aspect, the head portion 78 may be oriented such that the width ($W_h$) of the head portion 78 is oriented in the longwise or height ($H_s$) direction of the slot 24 allowing the head portion 78 to pass therethrough as its width ($W_h$) is smaller than the height ($H_s$) dimension of the slot 24 ($W_h<H_s$). In this configuration, the tongue portion 76 may reside in the slot 24 with the head portion 78 located on one side 20 of the slot 24 and the contact portion 74 on the other side 22 of the wash media element 50. It will be appreciated that the head portion 78 may be passed through the slot 24 in a variety of different ways.

Referring now to FIG. 8, according to an aspect, the treatment head 68 may be rotated within the slot 24 about 90 degrees (as represented by the arrow R) such that the width dimension of the head portion 78 may be oriented in the width dimension of the slot 24. According to another aspect, as the width ($W_h$) of head portion 78 is greater than the width ($W_s$) of the slot 24 in the nose portion 14 ($W_h>W_s$), the treatment head 68 is prevented from decoupling from the slot 24 and thus the tool 10. According to another aspect, the tongue portion 76 may be sized and formed of a compressible material such that it is wedged in the slot 24 to fixedly secure it therein, but can be easily uncoupled. It will be appreciated that the tongue portion 76 may have a variety of different widths and configurations. It will also be appreciated that the tongue portion 76 may be retained in the slot in a variety of different ways.

According to another aspect and with reference to FIG. 9, once the treatment head 68 is secured in the slot 24, the nose portion 14 of the tool 10 may be pulled back through the niche 66 in the wash media element 50 (i.e., from the front face 52 to the rear face 54). As the nose portion 14 is passed back through the slot 24, the head portion 78, which is coupled in the slot 24 also passes through the niche 66. According to an aspect, as the head portion 78 enters the niche 66, the shoulder portions 82 are able to slightly deflect inwardly toward the tongue portion 76 to allow the head portion 78 to pass therethrough. Once the head portion 78 exits on the rear face 54 of the slot 24, the nose portion 14 can be rotated to allow the head portion 78 to exit the slot 24. Additionally, once the head portion 78 exits onto the rear face 54 of the slot 24, the shoulder portions 82 can deflect back or return to their normal position. As the width ($W_h$) of the head portion 78 is greater than the width ($W_n$) of the niche 66, the shoulder portions 82 can engage the rear face 52 of the wash media element 50 to prevent the head portion 78 from passing back through the niche 66. This serves to keep the treatment head 68 secured to the wash media element 50 in a manner shown in FIG. 10. It will be appreciated that a variety of other methods for employed for securing the treatment head 68 to the media element 50 with the tool 10, including attaching the treatment head 68 to the slot before inserting the nose portion 14 into the niche.

According to a further aspect, prior to coupling the treatment head 68 to the tool, the treatment head 68 may be lubricated to assist in its entry into the niche 66. For example, the treatment head 68 may be soaked in a soapy water solution. The treatment head 68 could also be soaked in a variety of other suitable fluids or the like. Additionally, the wash media element 50 could be soaked in solution for the same person.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system for attaching a treatment head to a wash media element of a vehicle wash component, comprising:
   a tool having a nose portion configured to engage an aperture in the wash media element, wherein the nose portion has a first end and a second end defining a length therebetween;
   at least one treatment head including a base portion configured to pass through the aperture in the wash media element and sized to keep the base portion engaged with the wash media element while an opposing treatment portion is disposed on an opposite side of the wash media element;
   a slot formed in the nose portion for engaging the at least one treatment head, the slot having a height and width; wherein at least one of the height or the width has a smaller dimension than a head portion of the treatment head; and
   a handle portion secured to the second end of the nose portion to allow for easy manipulation by a user to effect attachment of the treatment head to the wash media element;
   wherein the handle portion has a width greater than a maximum width of the nose portion;
   wherein the nose portion is planar from the first end to the second end.

2. The system of claim 1, wherein the handle portion and the nose portion combine to define a t-shape.

3. The system of claim 1, wherein the first end of the nose portion is disposed remote from the handle portion and is pointed to facilitate insertion into the aperture, wherein laterally outward edges of the nose portion taper down to a common apex in a direction away from the handle portion.

4. The system of claim 1, wherein the nose portion is formed from a metal material.

5. The system of claim 1, wherein the handle portion includes a pair of opposing enlarged grip portions disposed thereover.

6. The system of claim 5, wherein the grip portions are formed of a different material than the handle portion.

7. The system of claim 5, wherein the opposing enlarged grip portions are tapered in a direction away from the connection of the handle portion to the nose portion.

8. A system for attaching a treatment head to a wash media element of a vehicle wash component, comprising:
   a tool having a nose portion configured to engage an aperture in the wash media element;
   a slot formed in the nose portion for engaging a treatment head, the slot having a height and width; wherein at least one of the height or the width has a smaller dimension than a head portion of the treatment head;
   a handle portion coupled to the nose portion to allow for easy manipulation by a user to effect attachment of the treatment head to the wash media element;
   at least one self-supporting treatment head configured to be attached to the wash media element; and
   the at least one treatment head including a base portion configured to pass through the aperture in the wash media element and sized to keep the base portion engaged with the wash media element while an opposing treatment portion is disposed on an opposite side of the wash media element;
   wherein the treatment portion includes a plurality of individually moveable portions.

9. The system of claim 8, wherein the treatment heads are formed of a foam material.

10. A system for attaching a treatment head to a wash media element of a vehicle wash component, comprising:
    a tool having a nose portion configured to engage an aperture in the wash media element;
    a slot formed in the nose portion for engaging a treatment head, the slot having a height and width; wherein at least one of the height or the width has a smaller dimension than a head portion of the treatment head;
    a handle portion coupled to the nose portion to allow for easy manipulation by a user to effect attachment of the treatment head to the wash media element;
    at least one self-supporting treatment head configured to be attached to the wash media element; and
    the at least one treatment head including a base portion configured to pass through the aperture in the wash media element and sized to keep the base portion engaged with the wash media element while an opposing treatment portion is disposed on an opposite side of the wash media element;
    wherein the base portion has a generally semi-circular shape.

11. The system of claim 10, wherein the treatment heads include a narrow neck pattern that connects the base portion with the treatment portion.

12. The system of claim 11, wherein a pair or shoulder portions are located at the connection of the neck portion to the base portion which shoulder portions engage a surface of the wash media elements to retain the treatment head secured to the wash media element.

* * * * *